United States Patent [19]

Campbell

[11] Patent Number: 5,198,867
[45] Date of Patent: Mar. 30, 1993

[54] ADAPTION OF LENSMETER OPTICS FOR MINIMIZING CONTACT LENS SPHERICAL ABERRATION

[75] Inventor: Charles Campbell, Berkeley, Calif.

[73] Assignee: Allergan Humphrey, San Leandro, Calif.

[21] Appl. No.: 696,664

[22] Filed: May 7, 1991

[51] Int. Cl.$^5$ .............................................. G01B 9/00
[52] U.S. Cl. ................................... 356/125; 356/127
[58] Field of Search ............................. 356/124–127; 351/43, 207

[56] References Cited

U.S. PATENT DOCUMENTS

| Re. 30,804 | 11/1981 | Lindemann et al. | 351/43 |
|---|---|---|---|
| 4,176,920 | 12/1979 | Ito | 351/207 |
| 4,180,325 | 12/1979 | Humphrey | 356/127 |
| 4,182,572 | 1/1980 | Humphrey | 356/127 |
| 4,247,176 | 1/1981 | Ito | 351/207 |
| 4,779,979 | 10/1988 | Iwane | 356/125 |
| 4,828,385 | 5/1989 | Fukuma et al. | 356/127 |

OTHER PUBLICATIONS

"Production Testing Method for Wide-Angle Domes" SPIE vol. 193, Optical System Engineering, 1979 pp. 265–267, D. Shafer.

Primary Examiner—Richard A. Rosenberger
Assistant Examiner—Hoa Q. Pham
Attorney, Agent, or Firm—Townsend and Townsend

[57] ABSTRACT

Adaptions of lensmeter optical trains are disclosed for enabling the measurement of contact lenses without the interference of spherical aberration from the highly meniscus lens formats of contact lenses. A generic system of measurement of the contact lenses when off of the eye is introduced by having light incident to or passing from the suspect contact lenses at an approximate aplanatic condition of the contact lens. The approximate aplanatic condition is determined by taking the average power of the posterior and anterior surfaces of the contact lenses for the general population—approximately 8 mm, assuming an index of refraction of approximately 1.5—calculating the aplanatic condition for such a "surface," and having light incident on the lenses for the interrogation of the lenses approximate the aplanatic condition. Modification of four optical trains for contact lens measurement is disclosed, including a Badal type optical train, a typical focusing lensmeter, an automated lensmeter utilizing mask pattern with photodetector array, and a lens system with a matrix of light focusing lenses.

10 Claims, 4 Drawing Sheets

ADAPTION OF LENSMETER OPTICS FOR MINIMIZING CONTACT LENS SPHERICAL ABERRATION

BACKGROUND OF THE INVENTION

Lensmeters for the measurement of eyeglass prescription are well known. This invention relates to lensmeters. More particularly, this invention relates to lensmeters for measuring contact lenses without the adverse effects of spherical aberration inherent in such measurements. Of late, such lensmeters have been automated. Such automated lensmeters have the advantage of not requiring operator interaction with the measuring apparatus. The operator's role with such machines is purely passive—all the operator does is to insert the lens to be measured in the meter and thereafter receive a reading—verifying or determining the power of the lens in sphere, cylinder, and axis.

Contact lenses and their measurement have posed a problem for lensmeters, whether the lensmeters are manual or automatic. Unfortunately, the users of manual automatic lensmeters fail to understand why such lensmeters cannot measure contact lenses accurately. There is a tendency to fault the manufacturer of lensmeters when the user realizes contact lenses cannot be accurately measured.

The problem in measuring contact lenses originates in the highly meniscus form of such lenses. This problem may be best understood by considering the optical effect of a contact lens on the human eye—and thereafter understanding the optical effect of such lenses when they are removed from the eye for measurement of their optical properties.

A contact lens maintains its position on the human eye by forming an interface of fluid contact between the posterior surface of the contact lens and the eye at the cornea. Simply stated, the ambient tear layer of the eye causes the contact lens to stay positioned on the eye.

The power of the contact lens is determined by the difference in optical power between the posterior and anterior surfaces of the contact lens. When the contact lens is on the eye, the posterior surface-to-eye interface has very little refractive effect on light entering the eye and the highly meniscus form of the lens conforms to the natural optics—also highly curved—of the eye. The difference in optical power between the posterior and anterior surfaces of the contact lenses imparts to the cornea changed prescription. There results corrected vision to the wearer of contact lenses.

In order for the contact lens to stay on the average human eye, considerable lens curvature is required. This lens curvature is in the order of 8 millimeters (mm) radius of curvature. While the effect of this curvature is largely not present when the lens is worn on the eye, the effect of the curvature becomes pronounced when the contact lens is removed from the human eye for testing This effect is present largely in the form of spherical aberration.

Spherical aberration is known. This effect can be simply understood considering the case of a highly curved refracting optical surface. It is found that bundles of rays entering the surface all parallel to the optical axis do not come to a common point of focus after being refracted by that surface. Rays which enter the surface at a common distance from the optical axis, or zone, do come to a common focal point, the zonal focus for that distance The distance of that zonal focal point from the surface is called the zonal focal length and it is different for each zone. The resulting "focus" of such refracting surfaces is said to exhibit "spherical aberration." Stated in other terms, the focus of the suspect optics having spherical aberration is distorted.

Unfortunately, lensmeters have heretofore relied on the basic assumption that the focal power of the suspect optics is constant over that suspect optic or at least constant in a given meridian in the case of an astigmatic optic. If the lensmeter is of the type which takes its sample over an extended aperture, it is found, in the case of spherical aberration, that since there is no one focal length for all zones of the aperture, one single, well-defined focal length cannot be found. If the lensmeter is of a type which restricts its sample to a single zone, an unique focal length can be found in the presence of spherical aberration but this focal length is different depending on which zone is picked Taking the case of a contact lens, with successive positive (anterior) and negative (posterior) refracting surfaces in the range of 60 diopters, significant spherical aberration will be found when the effective power of the lens becomes great. It is typically desired to find the paraxial power of a contact lens because this most closely gives its effect when worn on the eye. Unfortunately a lensmeter measuring zonal focal measuring zonal focal length cannot directly measure in the infinitely small zone corresponding to a paraxial power but must measure in larger zone and so will find a power different from the paraxial power. In the case of lensmeter measuring over a full aperture of many zones it is very difficult to decide on the desired paraxial focus because there is no clear-cut focal point. Unfortunately, users of lensmeters, especially automated lensmeters, ascribe the failure of such measurements in the case of contact lenses to the particular lensmeter and its manufacturer.

SUMMARY OF THE INVENTION

Adaptions of lensmeter optical trains are disclosed for enabling the measurement of contact lenses without the interference of spherical aberration from the highly meniscus lens shape of contact lenses. A generic system of measurement of the contact lenses when off of the eye is introduced by having light incident to, or emanating from, the contact lenses at the posterior surface of such lenses along rays converging to an approximate aplanatic condition of the contact lens. The approximate aplanatic condition is determined by taking the radius of curvature of the posterior and anterior surfaces of the contact lenses for the general population—approximately 8 mm, assuming an index of refraction of approximately 1.5, calculating the aplanatic condition for such a "surface," and having light incident on or emanating from the contact lenses for the interrogation of the lenses substantially between the second and third aplanatic points. Modification of four optical trains for contact lens measurement is disclosed, including a Badal type optical train, a typical focusing lensmeter an automated lensmeter utilizing a mask pattern with a photodetector array, and a lens system with a matrix of light focusing lenses.

OTHER OBJECTS, FEATURES AND ADVANTAGES

An object of this invention is to disclose an optical compromise to enable the adverse effects of spherical aberration to be largely eliminated from lensmeters when measuring contact lenses. According to this aspect of the invention, the spherical aberration present in the general population of contact lenses is approximated A mean value is taken of the anterior and posterior contact lens surfaces with an approximation of the spherical power present being in the range of 60 diopters or 8 millimeters of curvature. Thereafter, light is incident on or emanates from the suspect contact lens at an angle that falls between the second and third aplanatic points of the highly spherical portions of the contact lens This incidence or emanation largely neutralizes ambient spherical aberration present and enables overall lens power to be sufficiently measured to determine what the lens power of the contact lens is or will be when mounted on the eye.

An advantage of the disclosed modification is that lensmeters can be modified in at least two ways to achieve the disclosed result.

In a first modification, dual light sources are provided—one for the measurement of ordinary eyeglass (spectacle) lenses and the other light source for the measurement of contact lenses By switching between the light sources in a folded optical train, measurement of either eyeglass or contact lens being made can easily be made with measurement of the contact lenses with convergence.

In a second modification, additional optical lenses are placed within the optical train or elements moved within the optical train These added lenses impart to light incident to the suspect optics the convergence required to measure the suspect contact lens under test at points substantially between the second and third aplanatic points.

In both modifications, measurement of the suspect lens under test occurs utilizing the normal measurement protocol for the particular lensmeter being used. The measurement occurring includes the assigned aplanatic convergence (in the order of 50 diopters) with the addition of the ambient power present in the suspect optics or lens under tests. Thereafter, the aplanatic convergence is subtracted from the measurement, and the resulting power is reported as the "power" of the suspect optics.

An advantage of both disclosed modifications is that the technique is applicable to the broad range of lensmeters as a whole. By way of example, modifications in accordance with this invention are disclosed to a Badal type optical train, a typical focusing lensmeter an automated lensmeter utilizing mask pattern with photodetector array, and a lens system with a matrix of light focusing lenses.

A lensmeter utilizing Badal optics is disclosed that can readily be adapted to the measurement of contact lens removed from the eye. According to this aspect of the invention, the light incident on the contact lens to be measured is given an angle of incidence on the contact lens approximated to the aplanatic condition of the mean spherical curvature of the contact lens. All other measurements taken by the Badal system and following optics remain essentially unchanged. There results a system which readily determines the power of contact lens optics without being appreciably affected by the out-of-the-eye spherical aberration of the contact lens.

DESCRIPTION OF THE PREFERRED EMBODIMENT

Figure 1A:
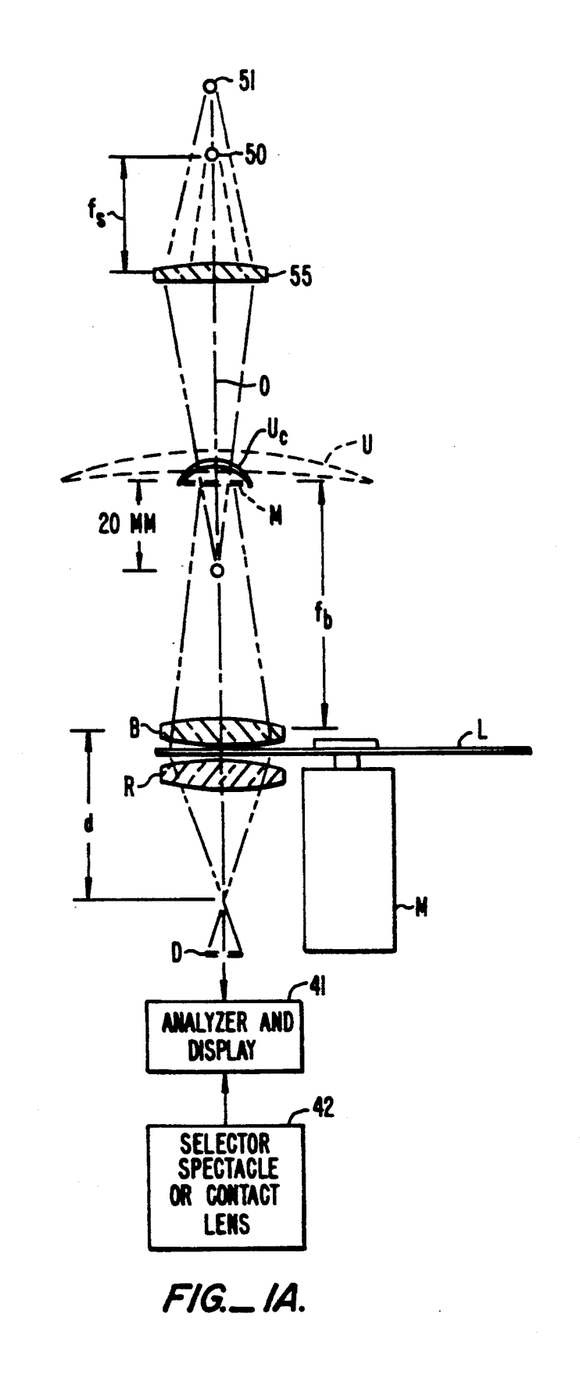
FIG. 1A is a side elevation of a lensmeter utilizing Badal optics, the apparatus measuring the excursion of light behind the Badal optics in a plane normal to the axis of the Badal system and relating this excursion to the vector signature of optical deflection of the lens, the system here being shown with a first light source for measurement of conventional spectacle lenses and second light source for aplanatic incidence to contact lenses removed from the eye for minimizing the effects of spherical aberration on measurement of contact lenses.

Referring to FIG. 1A, the embodiment of the invention herein disclosed is an automatic lensmeter which is simple in design compared to existing designs and can be constructed in a compact form. It also offers the possibility of measuring contact lens in such a way so as to avoid difficulties with spherical aberration, a fault which interferes with measurements made with existing lensmeters be they manual or automatic.

Figure 1B:
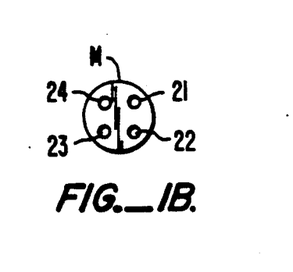
FIG. 1B is a detail of the multiple aperture utilized with this invention.

The design is best understood by referring to FIG. 1A. The lens under test U, here shown in broken lines U as an eyeglass lens, is shown placed with its posterior surface (or vertex) adjacent a multiple aperture M. Referring to FIG. 1B, multiple aperture M has at least three but typically four or a multiple of four small apertures nos. 21-24 arranged in a fixed pattern, most conveniently a square. This multiple aperture M can be a real, physical aperture or it can be the image of a real aperture.

Light is emitted from light source 50 through system lens 55. Light source 50 is one focal length $f_s$, from lens 55. Any light passing through the lens 55 for the purpose of measurement must first pass through one of these apertures of multiple aperture M. Entering lens U on its surface are multiple beams of light, one for each aperture in multiple aperture M. Each of these beams is uniquely defined by the direction of its principal ray which ray is defined as that ray in the bundle which passes through the center of its aperture. After passing through the apertures in multiple apertures M, the light ray bundles next encounter a Badal lens B, which is located such that its focal plane is coincident with multiple apertures M at a distance $F_b$ from lens B. This Badal lens can be considered to be the optometer lens of a Badal optometer system whose optometer space lies on the other side of Badal lens B from multiple apertures M. Therefore, the effective lens created by the Badal optometer system lies in the plane of multiple apertures M.

On the side of Badal lens B which is its optometer space is a chopper disk or moving boundary locus L. This disk is here illustrated as rotatably driven by a motor M and has a portion which is transparent and a portion which is opaque. The boundaries between these areas have the characteristic that at any radial distance from the center of the disk, the slope of one boundary must be different than that of the other. This moving boundary focus has been described in U.S. Pat. No 4,180,325, incorporated in its entirety to this disclosure by reference.

Because all rays of light which pass through the lens under test and reach lens B must pass through one of the apertures in multiple aperture M, these rays form a family of light rays which have an apparent point of emanation from their respective apertures in multiple aperture M. The multiple aperture M acts as an effective source of light. As this effective source of light is in the focal plane of Badal lens B, each ray, after passing through lens B must be parallel to all the other members of its bundle.

In addition, because the space on that side of B is a Badal optometer space, a ray will intersect the optical axis O at a distance from B linearly proportional to the power of the lens under test. Moving boundary locus L enables measurement of the distance that a ray that passes through its plane is from the optical axis. Lenses B and R are selected so that all light from lens U passes parallel between the lenses. Due the fact that all rays are parallel in this space, the distance the ray is from the optical axis in the plane of L is proportional to the distance d it crosses the optical axis from the Badal, lens B and hence it is proportional to the lens power.

Just after moving boundary locus L is another relay lens or optics R, which in conjunction with Badal lens or optics B images multiple aperture M onto detector D Each area of detector D onto which each aperture of multiple aperture M is mapped is a discrete photo detector. In other words, if there are four apertures 21-24 in multiple aperture M, then detector D is a quad detector, the preferred manufacture of this invention. Those having skill in the optic arts will understand that at least three such apertures must be provided to obtain lens measurement in sphere, cylinder and axis.

If the areas of detector D are sufficiently discrete and geometrically defined, their image in the plane of multiple aperture M can replace the real apertures This occurs because of the relay of the detector areas to the plane of multiple aperture M.

Light incident on detector D will create an electric signal. The signal created by detector D is similar to the signal created by the detector in a Humphrey Lens Analyzer and the refractive analysis is done in similar fashion. Such description is contained in U.S. Pat. No. 4,180,325 incorporated by reference in this application.

The source of light 50 is now discussed A convenient source is a light emitting diode (LED) which has the benefit of long life and low power requirement. In addition its physical size can be made small. Not only is its overall site small but its light emitting area can be very small which can be used to improve performance as will be shown.

First the source of light for the measurement of spectacle lenses will be discussed. Spectacle lenses $U_b$ are shown in broken lines. The LED 50 for spectacle lenses is positioned at the back focal point of source or condensing lens 55. Light exiting from condensing lens 55 will therefore be in collimation. However there will be a slight angular divergence of rays in the exiting beam because they come from physically separate areas of the source 50. The maximum divergence of these rays can be expressed as the angle fg whose the width of LED 50 divided by the focal fs of lens 55 (See FIG. 1). This divergence is important in the detection of the transition from light to dark detected by detector D as caused by the action of moving boundary locus L.

The smaller the diameter of the bundle of light in the plane of the locus L, the more rapid the transition and the greater the precision of the measurement. In the absence of a lens under test U, the diameter of the bundle in the plane of the locus L is the diameter of the apertures in M plus the focal length fb of Badal lens B times the tangent of the angle given above.

When a lens is in place for measurement, this diameter of the bundle of light is altered by the action of the lens U under test. This effect is negligible because the lens under test is almost coincident with the aperture M It is therefore seen that the small size of source 50 gives an advantage to the measurement. It will be seen that the beam exiting lens 55 is a single beam; those having experience in the optical arts will understand that multiple beams enter the lens U under test. The presence of multiple aperture M in effect creates multiple beams for analysis by means of locus L.

For the measurement of contact lenses, a second light source is employed For this illustration a contact lens under test designated $U_C$ is utilized. This lens $U_C$ occupies the same position as the spectacle lens U previously described.

As can be seen in FIG. 1A, source 51 is located on the optic axis O and on the far side of source 50 from lens 55. It is so placed that a real image of it is created by lens 55 at a distance of 20 mm beyond the plane of multiple apertures M. As will hereinafter be understood this 20 mm distance satisfies the aplanatic condition resulting in the elimination of the undesired spherical aberration of contact lenses Therefore in the case of no lens under test, the rays sampled by moving boundary locus L are defined by the apertures in multiple apertures M and the image of light source 51 acting as an effective aperture. This appears in the lensmeter optics, originally calibrated for the spectacle lens light source 50, as though a positive lens with a 20 mm focal length (or 50 diopters of power) were under measurement.

When a contact lens Uc is placed adjacent multiple apertures M for measurement, the power of that lens is added to the 50 diopters apparent lens to give a total power measured by the lensmeter. However since it is known to the operator that it the instrument is measuring in the contact lens mode, the 50 diopters is subtracted from the total measurement. Therefore the true value of the contact lens being measured can be determined.

I have schematically shown a display. This display can be a direct adaptation of that display set forth in Humphrey U.S. Pat. No. 4,180,325 incorporated to the application by reference. The full details of that disclosure will not be repeated here.

Further, and since the satisfaction of the aplanatic condition requires a 50 diopter convergence, modification of the display of the Humphrey U.S. Pat. No. 4,180,325 is schematically shown. When measurement of a contact lens is being undertaken, a selector is utilized. Actuation of the selector subtracts out 50 diopters of power from the indicated measurement. There remains only the power of the suspect contact lens optics Uc.

The reason for this unusual arrangement is as follows:

A contact lens, when measured in air with a lensmeter of usual design, wherein a parallel or collimated beams forms the measurement beam on one side of the lens, exhibits a large amount of spherical aberration due to its highly meniscus form. This meniscus form is a direct result of the concave surface which on the posterior side allows the contact lens to fit against the surface of the eye.

However, when such a contact lens is used on the eye, where its posterior side is against the tear film covering the cornea, it forms, in conjunction with the eye, a system which does not exhibit much greater spherical aberration than does the eye without the contact lens. This is because the principal effect of the contact lens is to slightly alter the corneal surface curvature, thereby slightly altering the overall power of the eye so as to correct its refractive error. It must be remembered that the overall power of a human eye is in the neighborhood of 60 diopters, whereas the refractive error is a relatively small fraction of this, lying s it does typically in the range of +5 to −7 diopters. As the effect of the contact lens on the eye creates only a minor change in the optical "form" of the eye system, the spherical aberration (which is a function of "form") of the eye system does not change markedly. Therefore, for the wearer of the contact lens, the paraxial power of the contact lens represents the effective power of the contact lens disregarding its highly curved posterior and anterior surfaces.

Due to the spherical aberration exhibited when both sides of the contact lens are in contact with air (as when the lens is measured off the eye), this paraxial power is very difficult to ascertain with a lensmeter of usual design. However if light is brought into the lens with a certain unique vergence condition, there is little, if any, spherical aberration and a zonal power measurement can be taken as the paraxial measurement.

When a lens is subject to spherical aberration, there are three conditions which, if satisfied, will result in no spherical aberration.

First, the image can be focused on the surface of the lens which has the spherical aberration Naturally, in such a lens arrangement, there will be no spherical aberration. I term this the "first aplanatic point" of the lens.

Secondly, light can converge with respect to the lens so that all rays converge at the center of curvature of the optical surface. By taking the mean value of the concave and convex surface of the contact lens, an approximate mean curvature is obtained. Thereafter, by having all incident or emanating rays from the lens be radial to this determined radius of curvature, a condition of theoretically no spherical aberration is produced I term this as the "second mean aplanatic point."

There is a "third aplanatic point" which point can be calculated. It is well known in the case of a single refracting surface that the non-trivial condition for spherical aberration is satisfied when a converging bundle of rays is brought into the surface in such a way that the converging rays would come to a focus on the same side of the surface as its center of curvature and at a distance D from the lens where:

$$D = (v' + v)R/v$$

Where
  R = radius of curvature of the surface
  $v'$ = index of refraction on the focus side
  $v$ = index of refraction on the entry side A first approximation is made that the contact lens acts as the mean curvature of its two surfaces Thereafter, a second approximation is made that it is sufficient to use a single mean for all contact lens.

Other values in the neighborhood will work. Then if $v = 1$ and $v' = 1.5$, $D = 20$ mm. This is the condition satisfied by the above design and gives it the ability to determine paraxial power of a contact lens from a zonal measurement without the confusion of spherical aberration. I hereafter refer to this design as the "third aplanatic point" of the contact lens $U_c$ under test.

Figure 2:
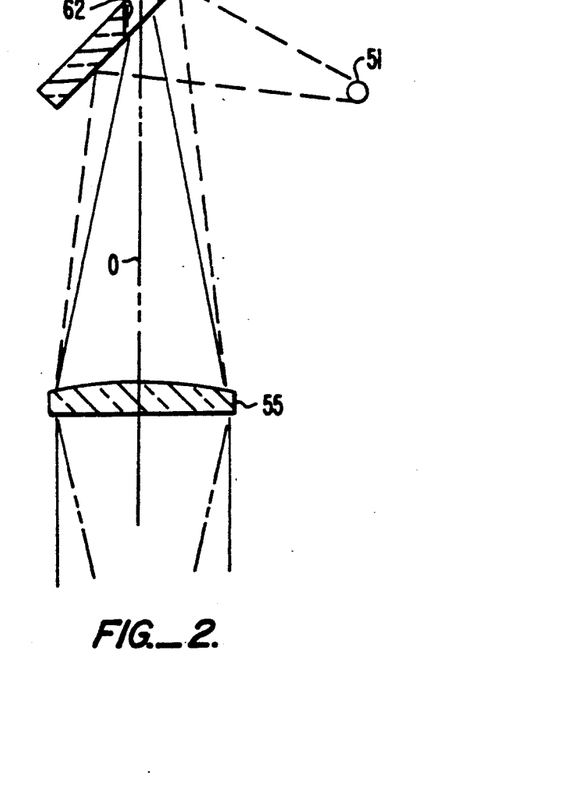
FIG. 2 is a detail of a folded optic path for permitting incidence of light along the axis of the Badal system at two differing distances from the Badal optics, one light source distance permitting conventional spectacle lens measurement and the other light source distance for enabling measurement of contact lenses at their approximate aplanatic point for minimizing the effects of spherical aberration.

Referring to FIG. 2, a simple folded optical path is shown which can be utilized conveniently for the two abovedescribed light sources 50 and 51. An apertured mirror 60 having central aperture 62 permits light for the conventional or spectacle light source 50 to pass directly along the optic axis O. When measurement of contact lens $U_C$ is desired, source 50 is extinguished and source 51 illuminated. The optical effect is substantially identical to the more understandable—but less practical—optical arrangement discussed with respect to FIG. 1A.

Figure 3A:
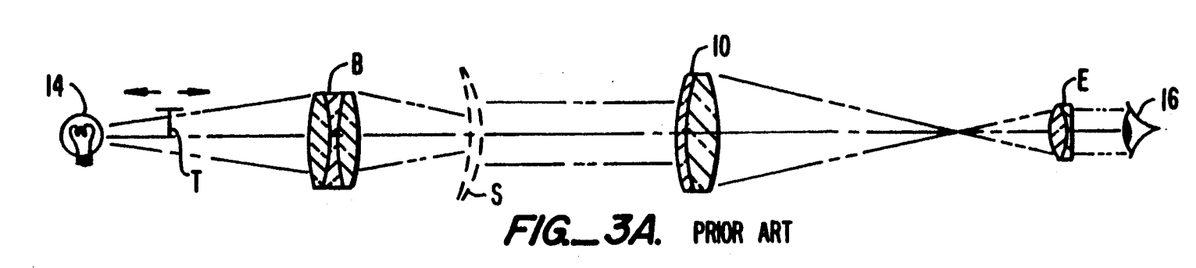
FIG. 3A is a diagrammatic representation of a prior art conventional lensmeter utilizing a conventional Badal optics with an aperture plate at the suspect optics for producing deflections dependent upon power of the suspect lens.

Referring to FIG. 3A, a prior art Badal type lensmeter is disclosed. Typically, a light source 14 illuminates a target T. Target T is usually in the form of a target mire. For the purposes of the disclosure here, it is shown as the capitalized letter "T". Target T is typically initially positioned one focal length of Badal optics B away from Badal optics B. Therefore, the image from target T through the Badal optics B emanates parallel light.

A suspect lens S is placed at one focal length of the Badal optic system from the Badal lens system B. Such lens are shown in FIG. 3 in broken lines in the form of an ordinary eyeglass lens.

The system is observed through a Keplerian telescope consisting of an objective 10 and an eyepiece E. Observation occurs at the eye 16 of the lensmeter operator.

In practice, target T is moved towards and away from the Badal optics B so that the image of target T appears in focus. Dependent upon the power of the suspect optics S, the distance of movement of the target T from its nominal position will change. This distance of movement of target T is directly related to the power of the suspect optics T. Simply stated, when the operator at eye 16 sees a focused image of the target T, the power of the suspect optics S is determined by the measurement of the distance of movement from the nominal position.

Those having skill in the optic arts will realize that systems of lens measurement are complicated by lenses having cylinder for correcting eye astigmatism. In such determination measurement of the target acuity is usually taken along orthogonal axes and combined to give readings of lens power in sphere, cylinder and axis. Since such readings are well known to those having skill in the art will not be further discussed herein.

Figure 3B:
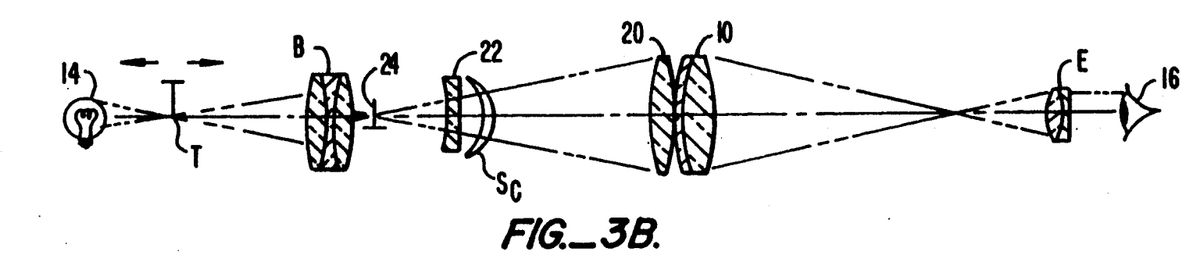
FIG. 3B discloses alteration of the prior art lensmeter system of FIG. 3A with the substitution of a first lens system adjacent the suspect contact lens optics and a second lens system adjacent the Badal optics.

Referring to FIG. 3B, modification of the optics of FIG. 3A has been made to allow the measurement of contact lenses $S_c$.

Observing the optical train, it can be seen that two system lenses 20, 22 have been added. The operation of the modification can be very simply understood.

Considering the case of the optics of FIG. 3B without the suspect lens contact lens $S_c$ being present at the measuring point, it will be understood that lens 20 images the parallel light to make that light appear as if it emanated from a point 24 which point is 20 mm behind the placement of the lens under test for measuring the power of contact lenses $S_c$. This is the mean aplanatic point for the contact lenses. It is located on the posterior side of the suspect contact lens $S_c$.

At the same time, lens 22 inserted immediately behind the contact lens $S_c$ is a plano convex lens. This plano convex lens 22 as is well known, forms with lenses 20, 22 a Galilean telescope.

It is important to note that the divergence of light from the suspect contact lenses Sc satisfies the aplanatic condition. It follows a path from an apparent aplanatic point 24 on the posterior surface of suspect contact lenses $S_c$.

The operation is as in FIG. 3A. Specifically, target T is moved towards and away from the Badal optics B until a focused image is observed through eyepiece E at the eye 16 of the operator.

With reference to FIG. 3B, the reader will note that light is incident from light source 14 toward suspect contact lens Sc. This light is diverging from the second aplanatic point 24 to the suspect contact lens Sc. It will be understood that either convergence from the aplanatic point or divergence to the aplanatic point will be sufficient for the practice of this invention. The reader will further understand that I contemplate a range of movement This range of movement will be more completely specified in the discussion of FIG. 6 hereafter.

Figure 3C:
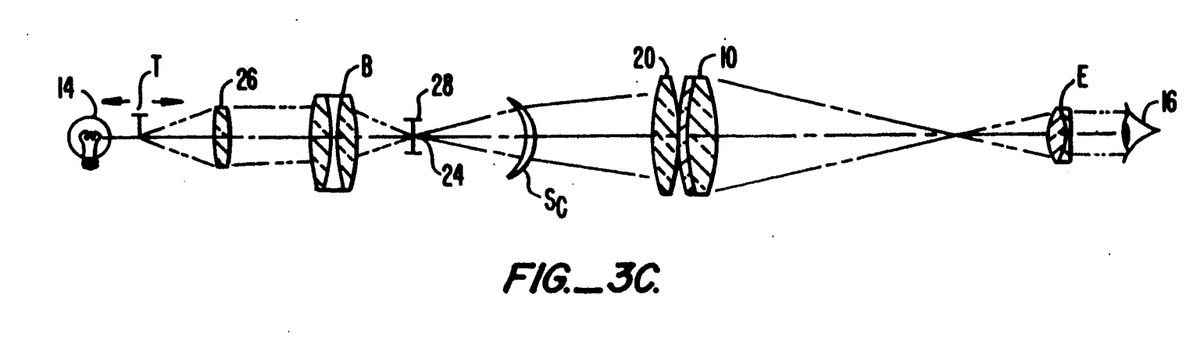
FIG. 3C illustrates a-iteration of the prior art lensmeter system by changing the location of the target image with respect to the suspect optics to achieve incidence to the contact lens along rays approximating the aplanatic condition.

Referring to FIG. 3C, a second modification of the optics of FIG. 3A is disclosed. A relay lens 26 is inserted on the opposite side of the Badal optics B.

Function of the relay lens 26 in combination with the Badal optics B is easy to understand. Specifically, a real image of target T is relayed by lens 26 to a position 28 which position 28 is 20 mm behind the suspect contact lenses $S_c$ at aplanatic point 24. Thus, objective O and lens 20 receive light diverging from the mean aplanatic point 28 for observation through the Keplerian telescope including lenses O and E.

Operation is as before. Target T is moved towards and away from the viewer with its distance of movement from its initial position being specifically related to the power of this suspect contact lenses $S_c$.

Figure 4A:
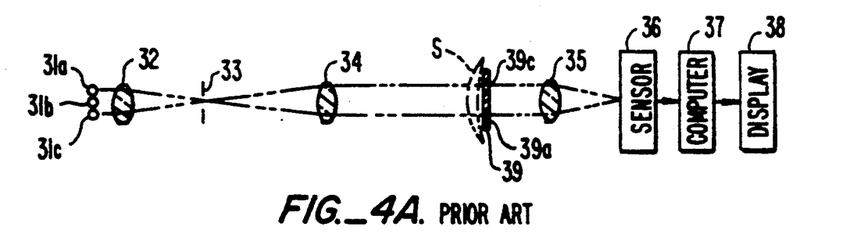
FIG. 4A illustrates a prior art lensmeter optical train from Iwane U.S. Pat. No. 4,779,979 issued Oct. 25, 1988.

Referring to FIG. 4A, a diagrammatic representation is present of a prior art optical system as taught by Iwane in U.S. Pat. No. 4,779,979 entitled Automatic Lensmeter issued Oct. 5, 1988 incorporated herein by reference of lens 32.

Simply stated, three light sources 31A, 31B and 31C emanate light through a lens 32 and a common aperture 33. Aperture 33 is one focal length of lens 32 distant from lens 32.

A lens 34 is in turn one focal length of lens 34 from the aperture 33. This results in the light from sources 31A-31C passing along parallel paths through a spectacle lens S (shown in broken lines) and an aperture plate 39 having apertures 39A-39C (aperture 39B not being shown).

Assuming a suspect lens S having no power, light then passes to a condensing lens 35 and focuses onto a sensor 36. Presuming no power in the suspect optics, images of light sources 31A-31C will be formed on sensor 36 in their spaced-apart alignment. As is conventional and set forth in Iwane U.S. Pat. No. 4,779,979, the spaced apart relation of the images of the apertures is analyzed by computer 37 and indicated as having no power at display 38.

When suspect optics S here shown as lens S is placed within the system, deviation of the images of the light sources 31A-31C will occur. This deviation will be transduced by the sensor 36 to the computer 37 indicating the sphere, cylinder and axis of the suspect optics S at the display 38.

Figure 4B:
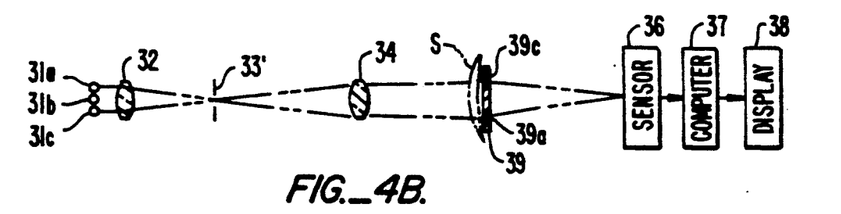
FIG. 4B illustrates alteration of the lensmeter optical train of FIG. 4A utilizing the relocation of pin hole optics and the removal of a system lens adjacent the light detector to produce the requisite angle of incidence for the aplanatic condition at the suspect contact lens; and, FIG. 5A illustrates a prior art lensmeter optical train from Fukuma et al U.S. Pat. No. 4,828,385 issued May 9, 1989.

Referring to FIG. 4B, modification of the light path of FIG. 4A is disclosed for the measurement of contact lens SC.

Modification is easily understood. Specifically, pinhole 33 is moved to a new location 33,. This location is slightly beyond the one focal length distance from lens 34 previously used; the spatial interval of one focal length from the lens 32 still remains. This movement beyond the focal length distance of lens 34 ascribes to the light impinging upon aperture plate 39 convergence. This convergence occurs to the mean aplanatic point of suspect contact lens $S_c$ at a distance 20 mm behind the point of measurement.

An important simplification of the optics of FIG. 4A has occurred but with the removal of lens 35. Since the light was converging to and towards the sensor 36, there is no need for a collector lens. Specifically, the images of the light sources 31A-31C will occur at sensor 36 be reported to computer 37 and indicated to sphere, cylinder and axis at display 38 all as set forth in the Iwane U.S. Pat. No. 4,779,979 incorporated to this disclosure by reference.

Figure 5A:
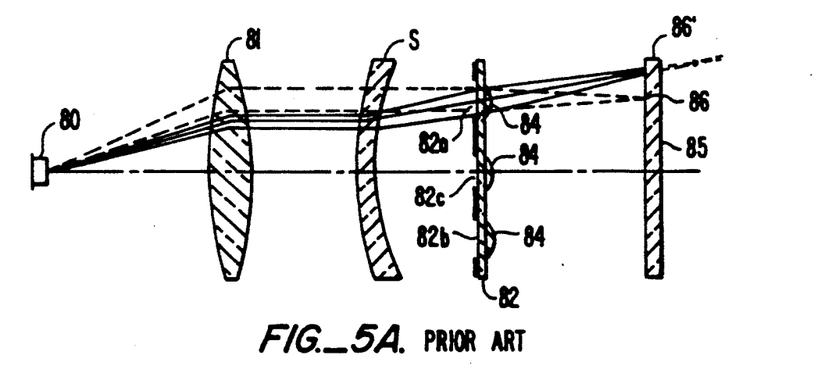

Referring to FIG. 5A, a prior art lensmeter train is shown. Specifically, the lensmeter there illustrated is taken from Fukuma, et al. U.S. Pat. No. 4,828,385 issued May 9, 1989 incorporated in this application by reference.

Simply stated, a light source 80 has light focused to a collimated disposition by lens 81 being positioned one focal length from the light source. Suspect spectacle lens S is placed at a measuring location spaced apart from an aperture plate 82 defining discrete apertures 82A-82C. As the suspect spectacle lens intercepts parallel light, location of the spectacle lens S to any fixed spatial interval from lens 81 will suffice. Each of the apertures includes on the opposite side thereof a focusing optic 84. The focal length of optic 84 is selected so that when suspect lens S is neutral, focus of light source 80 through all the discrete apertures occurs at sensor 85 at a point 86.

This much is illustrated in broken lines.

In solid lines there is illustrated the effect of the presence of a negative eyeglass lens S.

Specifically, the power of the negative lens S causes parallel light from a different portion of the lens S to pass through aperture 82A. This light is brought to a focus at 86, (it being pointed out that the focus of the image of the light source 80 is slightly changed).

Understanding the operation of this lensmeter is relatively straightforward. Dependent upon the power of the suspect optics S, impingement of the respective images of the apertures 82A, 82B and 82C will occur at differing points of the sensor 85. Thereafter, standard computation can occur.

Figure 5B:
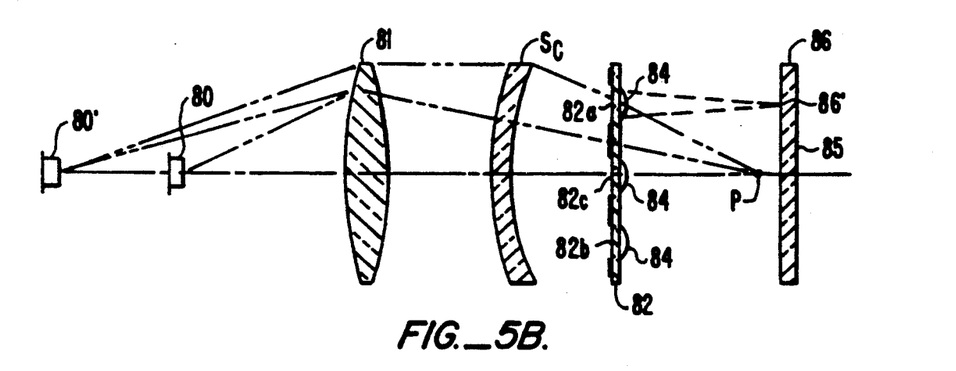
FIG. 5B is an altered embodiment of the lensmeter of FIG. 5A having its optical path modified by the introduction of a second light source to produce incidence at suspect contact lens optics to satisfy the approximated aplanatic condition.

Conversion of the optics herein illustrated is shown at FIG. 5B. Specifically, all that is required is a second light source 80'. It will be understood by those having skill in the art that the light source optics can include the configuration of those set forth with respect to FIG. 2.

Observing the effect of the change of the light source position to a position more distant from lens 81 causes light to be collected from the light source 80' to converge to the suspect contact lens optics $S_c$. In the convergence, and assuming a null condition, light would converge to a point P 20 mm behind suspect contact lens $S_c$ thus satisfying the mean aplanatic condition for the contact lens $S_c$.

Thereafter, all disclosed optics would remain the same.

Specifically by observing the migration of this spots 86' of the respective apertures 82A-82C on the sensor 85 determination of the optical prescription present can be made.

In the practice of this invention set forth in FIGS. 1A, 3B, 3C, 4B and 5B, I prefer to take all contact lens measurements at light incident along paths substantially between the second and third aplanatic points of the mean radius of curvature of the contact lens. Stated in other terms, a range of convergence or divergence will be sufficient for the practice of my invention. In order to understand this limitation, the following discussion with respect to FIG. 6 should be studied and understood.

While the aplanatic condition described gives the desired correction of spherical aberration, the point selected is not the only aplanatic point available. It is often referred to as the third aplanatic point. The second aplanatic point is found at the center of curvature of a single surface and for the purposes of this invention can be considered to be at the mean center of curvature of the two contact lens surfaces. Since the lensmeter made to practice this invention will operate in a range of conditions it is well to specify the range to which this invention applies.

Figure 6:
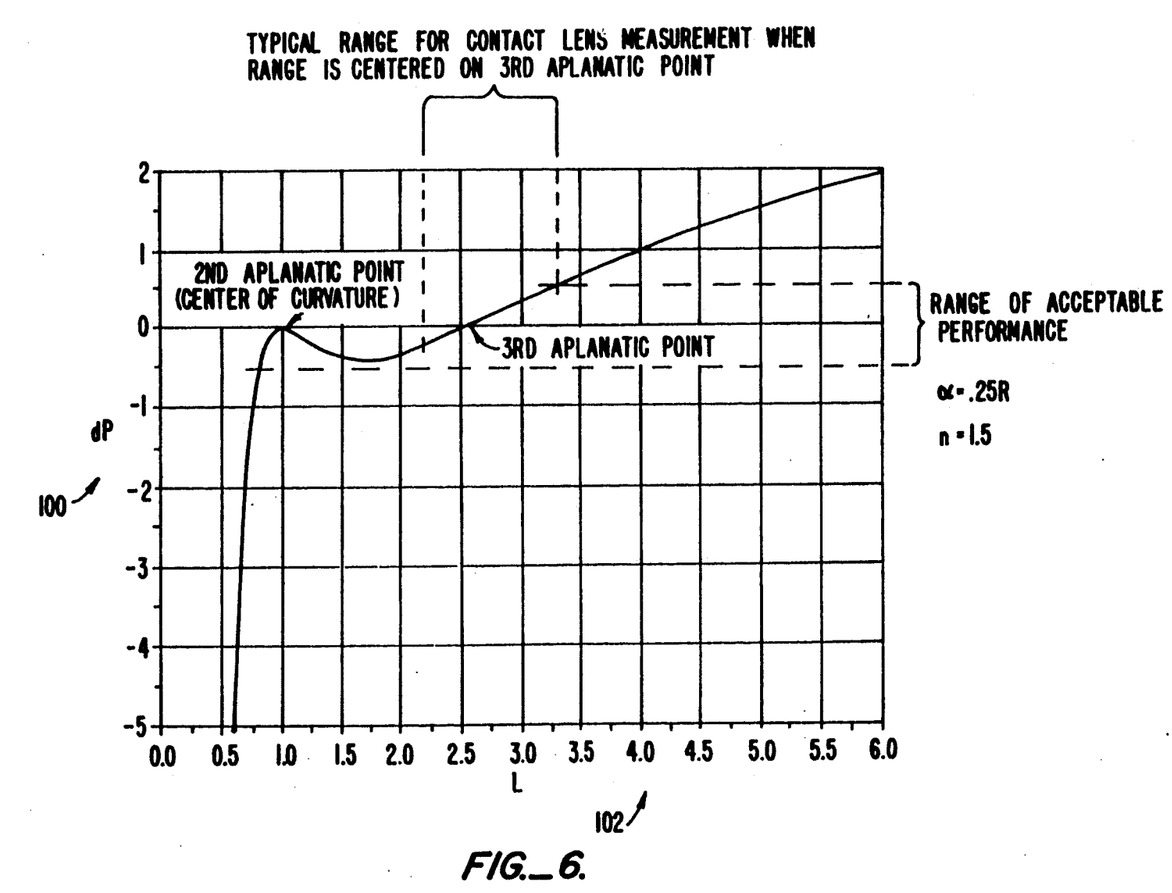
FIG. 6 is a graph of power error versus object distance illustrating the range over which the invention herein is operable for contact lenses substantially between the first and second aplanatic points.

To assist in illustrating this range, the figure has been given. This is a graph showing the power error 100 as a function of the distance 102 the interrogating beam is brought to focus beyond the contact lens prior to the refractive effect of the contact lens. The units have been made nondimensional by dividing each length by the mean radius of curvature. A fixed zonal radius (a) has been picked and is the same for all object distances (L). While longitudinal spherical aberration (abbreviated LA') could have been picked as the dependent variable, a new variable, proportional to LA' has been picked as it is more meaningful for the purpose of illustration in the case of a lensmeter It is power error (dP) defined as the difference between paraxial power and zonal power for the given value of L.

$zonal\ power = 1/L'$ $paraxial\ power = 1/l'$ $LA' = l' - L'$ $power\ error$
$(dP) = 1/L' - 1/l' = (l' - L')/l'L' = LA'/l'L'$ To convert the values in the figure to diopters of power, in the case of dP, and millimeters, in the case of L, dP is divided by the mean curvature of the contact lens in millimeters and L is multiplied by that value. So for a typical contact lens where the mean radius of curvature is 8 mm, the area of acceptable performance on the plot of FIG. 6 insures that dP is in the range of 1/16 diopter and ⅛ diopter. Notice that at the aplanatic points the power error (dP) is zero, as expected.

Under the assumptions made for control of spherical aberration, spherical aberration is only completely eliminated for one lens power and curvature combination. However the advantage of the method taught by this invention is that the deleterious effects of spherical aberration to the measurement of lens power are held within acceptable limits over the range of contact lens powers and curvatures expected This range of acceptable performance can be shown on the figure by using the following analytic method.

As described above, an offset of about 50 diopters must be subtracted from the measured lens value to get the true lens value. This results from the fact that the interrogating beam is initially brought to a focus approximately 20 mm beyond the suspect optic. This 20 mm distance is the previous compromise utilized for contact lenses set forth above. So the contact lens power can be thought of as a variation, or offset to the basic power of the focused beam. This offset caused by the lens power in turn can be thought of as changing the value of L away from its zero point value and hence changing the amount of spherical aberration induced. When the resulting change of spherical aberration is converted, as indicated above, to a power error (dP), it represents the change in correction induced by the lens. As the lensmeter is only corrected for offset at one point, the zero power point for instance, the additional error cannot be allowed to grow over the amount acceptable for contact lens measurement. The value suggested for this is 1/16 diopter.

This range, suitably scaled, is shown on the figure as a band of width one unit on the dP axis. To judge whether or not the correction is adequate, the zero point value of L is first converted to diopters. For instance, the third aplanatic point becomes 50 diopters.

Diopters = $1000/L \times 8$ mm; L = $1000/$diopters$\times 8$ mm
Then the expected power range of contact lenses is picked, in this case $+/-15$ diopters and these offsets are added to the zero point value to get the end points of the range. Finally, the end points are converted back to properly scaled L values and plotted as vertical lines. As can be seen in the figure, when this is done for the third aplanatic point as the zero power point, the range is just adequate in the minus power direction, that of increasing L.

Notice that the power range, measured in units of $L$, is not as large on the positive power side as on the negative power side This is always the case. The second aplanatic point is not a good choice due to the fact that L is quite short, leading to practical optical problems of implementation. It appears that there is little range on the positive power side of the second aplanatic point, but due to the shrinking of range with decrease in size of L this is not a limiting effect. So it can be seen that L may be picked between the second and third aplanatic point and even beyond the third aplanatic point and still practice the improvement of this invention. If the zero point value of L is chosen to be very much greater than that of the third aplanatic point, it will be found that the range of L around that zero point value will cause the value of dP to exceed acceptable limits.

Observing the graph of FIG. 6, the reader will realize that a range of possible angularities are present around the second and third aplanatic points that will render this disclosure operable This being the case, such ranges should be selected so that the accuracy of the resulting measurements fall within ⅛ of a diopter. Preferably, measurements should be accurate to about 1/16 of a diopter for an intermediate range for good clinical practice.

Therefore, the term used in the claim that says "along a path substantially between the second and third mean aplanatic focus of the contact lens" refers to the points being selected to generate this minimum ⅛ of a diopter accuracy.

The reader will by this time realize that either convergence of light or divergence of light from the suspect lens $S_c$ in a direction sufficient to satisfy the mean aplanatic point of the contact lens population in general is all that is required. As has been demonstrated, alterations to the optic systems illustrated to achieve this result may occur through numerous different embodiments.

I specify placement of the contact lenses relative to the optical train the reader will understand that both holders of spectacle lenses and contact lenses are well known. We therefore contemplate use of such holder meeting with acceptable standards such as those proposed by the International Standards Organization.

What is claimed is:

1. In the combination of a lensmeter for measuring the power of a lens to be tested comprising:
    a light source;
    a lens power measurement station disposed along an optical axis from said light source, said lens power measuring station including means for registering said lens to be tested at said lens power measurement station for measurement of the power of said lens to be tested;
    relay optics on said optical axis between said light source and said lens power measurement station for relaying a light of said light source to said lens power measurement station for incidence on said lens to be tested placed at said station;
    a light source observation station for receiving from said lens power measurement station deflected light of said light source to determine the power of said lens to be tested placed at said lens measuring station;
    means for receiving a contact lens to be tested at said lens power measurement station, said contact lens to be tested having a convex anterior surface and a concave posterior surface, said means for receiving a contact lens to be tested placed at said lens measuring station on said optic axis for measurement of the power of said lens to be tested and aligning concave posterior surface on one side of said lens power measurement station; and,
    means for causing light to be incident to said means for receiving a contact lens to be tested along a path converging toward the posterior surface of the contact lens to be tested substantially between the second and third mean aplanatic points of said contact lens whereby spherical aberration is minimized with respect to said contact lens.

2. The invention of claim 1 and wherein said relay optics relays light from said light source to said lens power measurement station along a converging path;
    said means for receiving said contact lens is placed at said lens measuring station to have light incident on said anterior surface for convergence to said second means aplanatic points of said contact lens from the posterior surface of said contact lens.

3. The invention of claim 1 and wherein said relay optics relays light from said light source to said lens power measurement station along a diverging path;
    said means for receiving said contact lens is placed at said lens measuring station to have light emanating from said anterior surface from said second mean aplanatic points of said contact lens to be tested with respect to the posterior surface of said contact lens.

4. The invention of claim 3 and wherein said light emanates from the second mean aplanatic points of said contact lens to be tested.

5. A process of measuring a contact lens to be tested in a lensmeter comprising the steps of:
    providing a light source;
    providing a lens power measurement station disposed along an optical axis from said light source;
    providing relay optics on said optical axis between said light source and said lens power measurement station for relaying light of said light source to said lens power measuring measurement station;
    providing a light source detection station for receiving from said lens power measurement station deflected light from said light source for determining the deflected power of lenses placed at said lens power measurement station;
    placing a contact lens to be tested to said lens power measurement station, said contact lens having a convex anterior surface and a concave posterior surface, said contact lens placed posterior surface aligned to one side of said lens power measurement station; and,
    angularly impinging light from said light source to said lens power measurement station, said light from said light source to be incident to said contact lens optics along a path substantially between the second and third mean aplanatic points of said contact lens whereby spherical aberration minimized with respect to said contact lens.

6. The process of claim 5 and wherein the angularly impinging step includes:

converging light from said relay optics to said lens measuring station;

placing said contact lens to be tested at said lens measuring station to have light incident on said anterior surface for convergence between said second and third aplanatic points of said contact lens with respect to the posterior surface of said contact lens.

7. The process of claim 5 and wherein the angularly impinging step includes:

diverging light from said light source to said lens measuring station;

placing said contact lens to be tested at said lens measuring station to have light emanating from said anterior surface of said contact lens.

8. The process of claim 5 and including the step of:

angularly impinging light to emanate form the apparent second means aplanatic focus of said contact lens to be tested.

9. In an auto lens meter for measuring spectacle lenses and contact lenses comprising:

light source means for emitting light;

collimator means for projecting said light emitted from said light source means as a parallel luminous flux;

a mask having a predetermined mask pattern for transmitting said luminous flux;

optical means positioned substantially adjacent to said mask pattern for condensing and focusing light passing through said predetermined mask pattern of said mask; and photodetecting means disposed t a position which is substantially conjugate to said light source means relative to said optical means, said photodetecting means for receiving a focused pattern of light corresponding to said mask pattern from said optical means, the image distance of said focused pattern of light being subsequently changed by the insertion of an optical system to be tested between said collimator means and said mask, the change in image distance corresponding to the refractive power of the optical system being tested;

the improvement to said optical system for measuring contact lenses including:

a second position for said light source moving said light source away from said collimator means for projecting said light emitted from said light source to be incident on said contact lens along a path substantially between the second and third aplanatic points of said contact lens whereby spherical aberration is minimized with respect to said contact lens.

10. An apparatus for measuring the optical characteristics of a lens to be tested disposed in a measuring optical system for measuring spectacle lenses and contact lenses by applying light means from a plurality of light sources to said disposed lens to be examined through a portion of said measuring optical system, including:

a first lens between said light source and an aperture for relaying images of said light source through said aperture;

an aperture;

a second lens registered to said aperture for relaying the images of said light sources from said aperture to a spectacle lens to be measured, said relay to said suspect optics occurring along a collimated path;

a mask at said suspect optics for sampling discrete points in said lens;

a sensor;

a focusing means for focusing said apertures to said sensor for measurement of the position of said mask sampling apertures at said sensor, the improvement comprising:

means for mounting a contact lens to be tested to said apparatus for measuring the optical characteristics of a lens to be tested;

means for moving said aperture relative to said first and second lens for producing convergence between the second and third mean aplanatic points of said contact lens whereby spherical aberration is minimized with respect to said contact lens.

* * * * *